United States Patent
Grimm et al.

(10) Patent No.: US 12,357,436 B2
(45) Date of Patent: Jul. 15, 2025

(54) METHOD FOR PRODUCING DENTAL FITTING BODIES AND WORKPIECE FOR THIS PURPOSE

(71) Applicant: DENTSPLY SIRONA INC., York, PA (US)

(72) Inventors: Philipp Grimm, Ludwigshafen am Rhein (DE); Oliver Nowarra, Leimen (DE)

(73) Assignee: Dentsply Sirona Inc., York, PA (US)

( * ) Notice: Subject to any disclaimer, the term of this patent is extended or adjusted under 35 U.S.C. 154(b) by 1023 days.

(21) Appl. No.: 17/291,532

(22) PCT Filed: Nov. 14, 2019

(86) PCT No.: PCT/US2019/061361
§ 371 (c)(1),
(2) Date: May 5, 2021

(87) PCT Pub. No.: WO2020/102473
PCT Pub. Date: May 22, 2020

(65) Prior Publication Data
US 2022/0000593 A1    Jan. 6, 2022

(30) Foreign Application Priority Data
Nov. 15, 2018   (EP) ..................................... 18206375

(51) Int. Cl.
*A61C 13/00*     (2006.01)
*B23C 3/00*      (2006.01)

(52) U.S. Cl.
CPC ...... *A61C 13/0006* (2013.01); *A61C 13/0022* (2013.01); *B23C 2220/04* (2013.01); *Y10T 409/303808* (2015.01)

(58) Field of Classification Search
CPC .................................................. B23C 2220/04
See application file for complete search history.

(56) References Cited

U.S. PATENT DOCUMENTS 9,050,666 B2    6/2015  Kuroda
2002/0076530 A1 *  6/2002  MacDougald ..... A61C 13/0022
                                              428/195.1

(Continued)

FOREIGN PATENT DOCUMENTS

DE  102015010322 A1 *  3/2016  ............... B23C 3/00
EP      1088620 A1 *  4/2001

(Continued)

OTHER PUBLICATIONS

"European Application Serial No. 18206375.0, Communication Pursuant to Article 94(3) EPC mailed Mar. 11, 2021", 6 pgs.

(Continued)

*Primary Examiner* — Erica E Cadugan
(74) *Attorney, Agent, or Firm* — SCHWEGMAN LUNDBERG & WOESSNER, P.A.

(57) ABSTRACT

In the method for producing medical, in particular dental fitting bodies with a specified or custom three-dimensionally curved outer contour or preform of the fitting body with a rough outer contour, which has an allowance relative to the outer contour, a workpiece from which the fitting body or its preform is produced, is machined in a material-removing manner by means of a tool engaging in the workpiece The tool path has directional components transverse to the run of the contour to be produced and the cutting edges have a defined geometry. The tool engages into the workpiece at a cutting arc angle alpha of the circumferential surface of less than 90° on average and at an insertion depth of at least twice the tool diameter (D) and the machining of the workpiece occurs along a tool path with directional components contrary to a machining direction following the outer contour.

14 Claims, 6 Drawing Sheets

(56) References Cited

U.S. PATENT DOCUMENTS

| | | | |
|---|---|---|---|
| 2005/0019121 A1* | 1/2005 | Suttor | B23C 5/10 409/131 |
| 2006/0141250 A1 | 6/2006 | Basler et al. | |
| 2007/0048689 A1 | 3/2007 | Holzner et al. | |
| 2008/0196704 A1* | 8/2008 | Georgiadis | A61C 3/02 407/53 |
| 2010/0028836 A1 | 2/2010 | Gubler et al. | |
| 2012/0148985 A1 | 6/2012 | Jung et al. | |
| 2016/0291585 A1 | 10/2016 | Leeson et al. | |
| 2018/0360576 A1* | 12/2018 | Schlachter | A61C 13/0004 |

FOREIGN PATENT DOCUMENTS

| | | |
|---|---|---|
| EP | 1974688 A1 | 10/2008 |
| EP | 2692311 B1 | 6/2016 |
| EP | 3199124 A1 | 8/2017 |
| EP | 3653167 A1 | 5/2020 |
| EP | 3653167 B1 | 1/2023 |
| WO | WO-2020102473 A1 | 5/2020 |

OTHER PUBLICATIONS

"European Application Serial No. 18206375.0, Extended European Search Report mailed Jan. 25, 2019", 8 pgs.

"European Application Serial No. 18206375.0, Office Action mailed Sep. 15, 2021", 1 pgs.

"European Application Serial No. 18206375.0, Response filed Jul. 20, 2022 to Office Action mailed Sep. 15, 2021", 61 pgs.

"European Application Serial No. 18206375.0, Response filed Aug. 30, 2021 to Communication Pursuant to Article 94(3) EPC mailed Mar. 11, 2021", 14 pgs.

"European Application Serial No. 18206375.0, Response filed Nov. 17, 2020 to Extended European Search Report mailed Jan. 25, 2019", 56 pgs.

"International Application Serial No. PCT/US2019/061361, International Preliminary Report on Patentability mailed May 27, 2021", 7 pgs.

"International Application Serial No. PCT/US2019/061361, International Search Report mailed Feb. 10, 2020", 3 pgs.

"International Application Serial No. PCT/US2019/061361, Written Opinion mailed Feb. 10, 2020", 5 pgs.

* cited by examiner

TOOL AND WORKPIECE ARE SUBJECTED TO A
RELATIVE MOVEMENT ALONG THE TOOL PATH
DIAGONAL TO THE TOOL AXIS

FIG. 8

METHOD FOR PRODUCING DENTAL FITTING BODIES AND WORKPIECE FOR THIS PURPOSE

CROSS-REFERENCE TO RELATED APPLICATIONS

This is a National Phase application of International Application No. PCT/US2019/061361, filed Nov. 14, 2019, which claims the benefit of and priority to EP Application Ser. No. 18206375.0 filed Nov. 15, 2018, which are herein incorporated by reference for all purposes.

FIELD OF THE INVENTION

The invention relates to a method for producing medical, in particular dental fitting bodies with a specified or custom three-dimensionally curved outer contour or preform of the fitting body with a rough outer contour, which has an allowance relative to the outer contour. A workpiece for producing dental fitting bodies has at least a first outer surface for connection to a holder or for fastening in a holder and at least one further, second outer surface for machining the workpiece by contact with a machining tool.

BACKGROUND OF THE INVENTION

A method for producing a dental object by means of grinding a ceramic or ceramic-plastic composite material blank is known from EP 3 199 124 A1, in which for producing a preform with an outer contour that differs from a final outer contour of the dental object to be produced, a grinding channel is ground in the blank or in a pre-preform already carved from the blank by means of a grinding tool of a grinding device. The outer contour of the preform is formed with the grinding channel, on one of the edges thereof, and on the edge of the grinding channel opposite the outer contour of the preform, at least one remnant is detached, at least area wise, from the blank or from the pre-preform.

As the grinding channel is being ground in the blank or in the pre-preform, the movement of the grinding tool can be a combination of a rotation of the grinding tool about its longitudinal axis and a forward feed movement in a longitudinal direction of the grinding channel and a movement of the grinding tool with its longitudinal axis with at least one movement component orthogonal to the longitudinal direction of the grinding channel.

The disadvantage of this is that with grinding, only small volumes per unit of time can be removed. Hence with an 8 mm insertion depth of the tool and a 0.05 mm sidestep for removing material along a free surface at a speed of 4 mm/sec, a volume of 1.6 mm³/sec will be removed. This is important in the sense that according to the state of the art, remnants must be detached from the blank rather than eliminated by removing material.

A method for milling a workpiece is known from DE 10 2015 010 322 A1, in which an engagement angle of an end mill is limited by a circular movement of said end mill during the machining of concave curves. The milling path is trochoid-like.

Producing a preform of a dental article from a pre-sintered dental milling blank by machining such as milling or grinding is known from EP 2 692 311 B1. To free up the dental article, the contour of the dental article is removed layer-wise in one plane at a time, so that the layer of the next plane can then be removed with a new penetration depth. This method is employed in, for example, the MCXL and MC X5 milling and grinding machines of SIRONA Dental Systems GmbH, Bensheim. The maximum thickness of the layer in a plane is thus equal to a tool diameter.

The dental article thus remains within the dental milling blank, but to a large extent it is freed up therein so that manual detachment with a diamond drill is possible.

SUMMARY OF THE INVENTION

The object of the invention consists of specifying a method in which the machining speed during the production of dental fitting bodies is increased while prolonging service life.

DISCLOSURE OF THE INVENTION

In the method according to the invention for producing medical, in particular dental fitting bodies with a specified or custom three-dimensionally curved outer contour or preform of the fitting body with a rough outer contour that has an allowance relative to the outer contour, a workpiece from which the fitting body or preform is produced is machined in a material-removing manner by means of a tool that engages into the workpiece with one or a plurality of cutting edges arranged on a circumferential surface of said tool. For machining, the tool having a tool axis is rotated about said tool axis, and the tool and the workpiece execute a relative movement along a tool path orthogonal or inclined to the tool axis. The tool path furthermore has directional components transverse to the run of the contour to be produced.

The one or more cutting edges have a defined geometry and the tool inserts into the workpiece with a cutting arc angle of the circumferential surface of less than 90°, at least on average, and with an insertion depth of at least twice the tool diameter.

The workpiece is machined along a tool path with directional components contrary to a machining direction following the outer contour or the rough contour.

In the sense of this invention, a dental fitting body is understood to mean a component that is intended for use as a tooth replacement in its final machined form and that therefore has a custom, three-dimensionally curved outer contour. This outer contour is known. However, the invention in particular also comprises preforms of the fitting body arising during the machining of a workpiece from which said fitting body is carved, which have a rough outer contour that has an allowance relative to the outer contour of the fitting body, which can be reduced by removing material by a machining step or additional machining steps until the final size of the fitting body is reached. The cutting arc angle is also known as the arc of contact and is the area of the circumferential surface of the tool that is in contact with the workpiece during the machining. It has been shown that a cutting arc angle of at most 60°, at least on average, can be advantageous.

A tool with one or a plurality of cutting edges having a defined geometry can be a milling tool. The insertion depth can preferably be 2.5 to 6 times the tool diameter for fitting bodies and even up to 8 times or more for larger workpieces, provided that the stability of the workpiece is sufficient. The difference between milling and grinding lies for one thing in the tool: a grinding tool has an unknown number of unoriented cutting elements, whereas a milling tool has a known number of oriented cutting elements. Also, the chip space between the cutting elements is much smaller in a grinding tool than in a milling tool. Very different process parameters and machining strategies are chosen in both methods as a result of these tool properties. In order to achieve an acceptable volume per unit of time with grinding, a high insertion depth is chosen because of the small chip space, which leads to a correspondingly high stress on the circumferential surface and small sidesteps. With milling in contrast, comparatively small insertion depths are chosen with high sidesteps because of the large chip space between the defined cutting elements. The volume per unit time is therefore greater than in grinding.

It has been shown that with the method according to the invention, a machining with defined cutting edges is also possible with high insertion depth.

A detachment of remnant material, which requires a correspondingly deep penetration into the workpiece, is therefore also possible in the case of machining with defined cutting edges. By avoiding full-width cutting, cutting depths greater than 2×D are achievable without any major problems, even without specially designed milling tools.

Because of the problems described here, standard milling is performed with low forward feed rates and shallow cutting depths. A maximum milling depth of 1× the tool diameter is typical. A tool path orthogonal or diagonal to the tool axis, wherein said tool path has directional components transverse to the run of the contour to be produced and contrary to the machining direction following the contour, is known for example in trochoidal milling, which is also known as wave (cut) milling, circular slot milling, trochoidal speed cutting, etc.

In order to detach remnant material, the cutting depth and thus the insertion depth are dependent on the height of the block and on the length of the cutting elements of the tool employed.

Advantageously, the machining length of the defined cutting edges arranged on the circumferential surface can be greater than or equal to the thickness of the workpiece in the direction of the tool axis of the tool, and machining can occur exclusively along the circumferential surface over the entire thickness of the workpiece.

The advantage of this is less wear on the tip for a corresponding length, thus prolonging service life.

For the case in which the machining length of the defined or undefined cutting edges arranged on the circumferential surface is less than the thickness of the workpiece in the direction of the tool axis of the tool, a first machining can occur over a fraction of the entire thickness of the workpiece with the cutting edge or elements arranged on the circumferential surface. This leaves an unmachined remaining thickness and after a 180° rotation of the workpiece, a second machining can occur along the circumferential surface over a remainder of the total thickness of the workpiece. Advantageously, in addition to the cutting edge or elements arranged on the circumferential surface, the tool can have defined cutting edges with material removal in an axial direction arranged on its axial end, and a machining can also occur with the defined cutting edges with material removal in an axial direction. A second machining can occur with exclusion of the cutting edges with material removal in an axial direction.

These cutting edges can be arranged on an end surface, but can also be formed as ball tips or cone tips.

The tool can advantageously be brought into engagement with the portion of the cutting edges arranged on the circumferential surface, which has a maximum possible distance to the tool tip. The advantage of this is that the stability of the tool is improved and the area of the tip, which is highly subject to wear and which is used in subsequent machining steps for producing the final contour, is protected.

Advantageously, the insertion depth of the tool in the workpiece along the symmetry axis of the tool can be subjected to a change of preferably up to 0.2×D, in particular in the range of 0.1×D, during the forward movement and/or lateral and backward movement.

With frequent and consistent use of the same block height, it is thus possible to avoid having the same place of the cutting edges always contacting the top or bottom of the block and thus causing sharply delimited, stepwise wear.

Advantageously, a further machining of the workpiece can occur in an alignment of the tool and the workpiece relative to each other than in the previous machining. This can occur by rotating the workpiece about a workpiece axis, particularly during a machining pause. The rotation can be 90° relative to the previous alignment; however, other angles of rotation and several rotations with one machining process each are also possible.

It is thus possible to reduce the time for subsequent machining steps, i.e., ones involving fine machining. This can be the case particularly if the workpiece already has additional surfaces in planes other than the main ones of a cube or rectangular solid, for example chamfering or flattening that make the workpiece closer to the outer contour of the fitting body to be produced.

In the machining of the workpiece, the fitting body to be produced or the preform can advantageously be connected to a workpiece remnant via an inner support section to be fashioned during the machining, and the tool can be inserted into the workpiece laterally to the support section to be fashioned outside of an equator line of the fitting body or of the preform, in a manner known in the state of the art for machining by grinding. Even if the workpiece is weakened by material removal in the area of the bar, this machining method can still bring about a sufficient improvement.

In the machining of the workpiece, as an alternative the fitting body to be produced or the preform can be connected to a workpiece remnant via an inner support section to be fashioned during the machining, and the tool can be inserted into the workpiece at a distance from the support yet to be fashioned, and in a manner such that it is oriented on an equator line of the fitting body or of the preform.

The advantage of this is that the stability of the workpiece in the area of the bar to be produced is maintained longer during the production.

Advantageously, the machining tool can be inserted into the workpiece exclusively transversely to the tool axis for machining the workpiece by trochoidal milling. It is thus possible to protect the tip of the tool, which can then be used optionally for producing the final contour.

Before the insertion of the machining tool into the workpiece, the machining tool can advantageously be positioned in a recess of the workpiece. If workpieces with pre-drilled recesses or holes are provided, the machining can be started from these recesses and there is no need to bring the tool in proximity to the equator line as part of the machining of the workpiece edge. This improves the service life of the tool for trochoidal milling.

For producing a recess prior to the machining of the workpiece by trochoidal milling, the machining tool or another machining tool can advantageously be inserted in the direction of the tool axis of the machining tool or of the other machining tool. It is thus possible to prolong the service life of the tool for trochoidal milling, particularly if use is made of another tool that is particularly suitable for creating recesses. A standard drilling tool is particularly suitable for creating a recess.

Advantageously, at least two tools may be present and engage on the workpiece for the simultaneous machining of the same, wherein the two tools are arranged at a parallel distance of the tool axes relative to each other and are guided and driven from opposing sides.

Using two tools simultaneously further shortens the machining time.

Furthermore, the workpiece can advantageously consist of a chip-forming material and be chosen from:
ceramics in a pre-sintered state such as glass ceramic, zirconium dioxide
filled or unfilled plastics
metals in a pre-sintered state.

With these materials in particular, the machining time can be shortened and the service life of the tool can be prolonged.

Further subject matter of the invention is constituted by a workpiece for producing dental fitting bodies, in particular for carrying out the method described in the preceding. [The] workpiece has at least one first outer surface for connection to a holder or for fastening in a holder and at least one further second outer surface for machining the workpiece by contact with a machining tool. The workpiece has at least one recess that is situated completely within its second outer surface, and the recess is spaced apart from the first outer surface. The recess penetrates the workpiece at least partially, in particular completely.

The advantage of this is that the machining of the workpiece does not have to start from the edge, but can also start from inside, in other words from within the edge outwards. The recess can be formed in the workpiece by drilling or it can have already been formed during the production of the workpiece. Accordingly, the workpiece can be shaped from a granular material, e.g., from a powder by pressing, and thus the recess can be already provided in the workpiece.

The recess advantageously has a least 1.2 times and at most 10 times the diameter of a machining tool typically used for machining the workpiece for the production of dental fitting bodies. The diameter of these machining tools, which can be embodied as milling tools or grinding tools, is typically between 0.8 and 5 mm, in particular 2.5 mm to 3.5 mm.

The recess advantageously has a distance to the first outer surface that corresponds to at least twice and preferably at most 50 times the diameter of a machining tool typically used for machining the workpiece for the production of dental fitting bodies.

BRIEF DESCRIPTION OF THE DRAWINGS

The method according to the invention is explained with reference to the drawings. The Figures show:

FIG. 8 schematically depicts a further variant in which the tool and workpiece are subjected to a relative movement along a tool path diagonal to the tool axis.

DETAILED DESCRIPTION OF THE INVENTION

Figure 1:
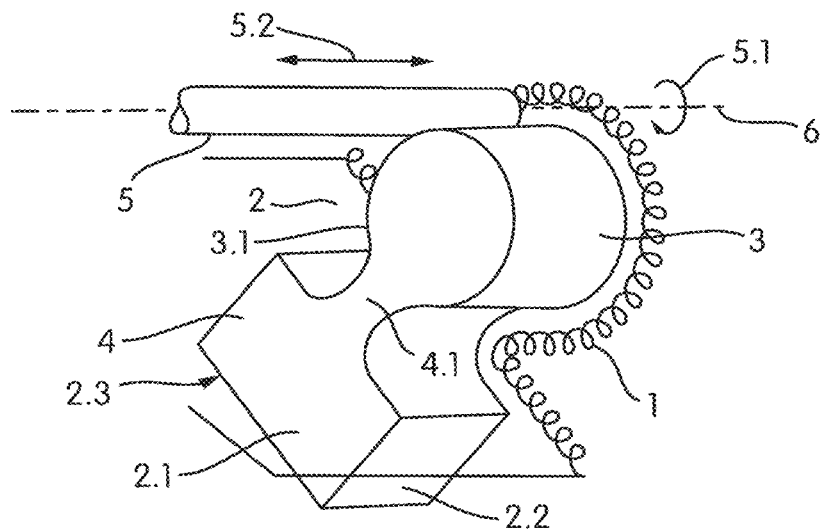
FIG. 1 is a perspective view of a tool path known from the state of the art for machining a workpiece for the production of a dental fitting body.

FIG. 1 shows a perspective view of a tool path 1 known from the state of the art for grinding, i.e., machining with tools with non-specific cutting edge geometries, for machining a workpiece 2 for the production of a preform of a fitting body 3 with a contour 3.1. In the workpiece 2 shown here, the original shape of a rectangular solid can still be discerned from an unmachined workpiece remnant 4 and the contour 3.1 to be produced, and the machining of the workpiece 2 occurs in a first alignment of the workpiece 2 to a tool 5, which during the machining rotates about a tool axis 6 that is the longitudinal axis of the tool 5, as represented by the arrow 5.1. The tool 5 with its tool axis 6 is essentially orthogonal to one of the lateral surfaces 2.1 and parallel to the other two lateral surfaces 2.2, 2.3 of the workpiece 2.

Furthermore, the tool 5 can be moved in the direction of its longitudinal axis 6, as represented by the arrow 5.2.

The preform of the fitting body 3 is connected via a support section 4.1 to the unmachined workpiece remnant 4 and the support section 4.1 is dimensioned such that further machining of the preform is possible in order to bring the preform to the final dimensions of the fitting body.

The tool 5 designated as a milling tool engages, with one or a plurality of cutting edges 8 arranged on a circumferential surface 7 of the tool with a diameter D, which have a defined geometry and to which a chip space g adjoins (FIGS. 1A, 1B), into the workpiece 2, which is thus machined by removing material.

Figure 1A:
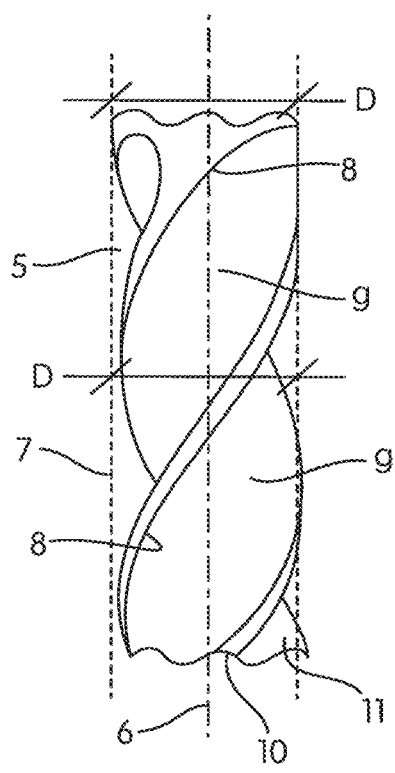
FIG. 1A is a plan view of a milling tool.
Figure 2A:
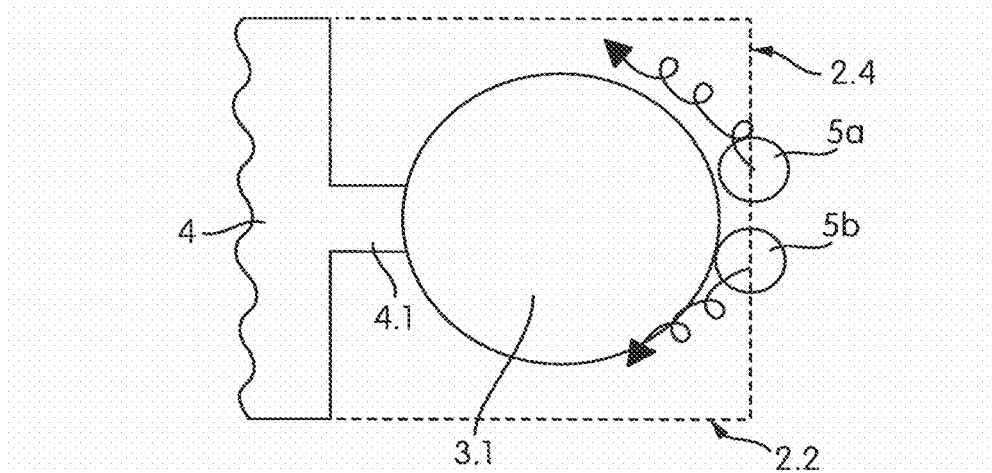
FIG. 2A is a schematic illustration of a simultaneous machining of a workpiece with two tools, viewed from above.
Figure 2B:
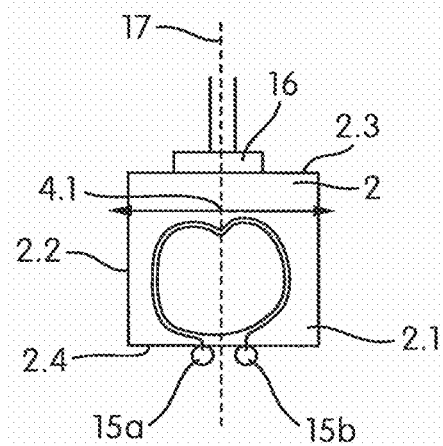
FIG. 2B is a top view of a simultaneous machining with a limited cutting-edge length that is less than the block height.
Figure 2C:
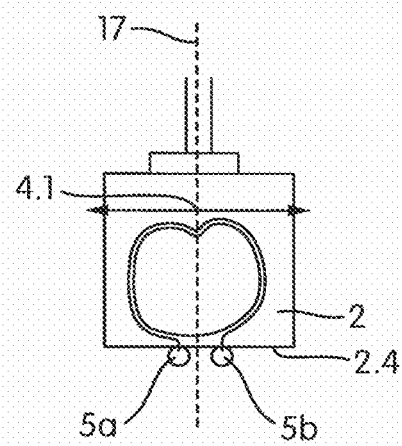
FIG. 2C is a top view of a simultaneous machining over the total block height.

The tool 5 has an insertion depth ta, tb, tg (FIG. 2E, F) in the workpiece 2 of sufficient magnitude such that the tool 5 protrudes from the workpiece 2 by its not explicitly illustrated tool tip 10 (FIG. 1A, also see FIG. 2C).

As can be discerned from FIG. 1A, cutting elements 11 having a defined geometry are also arranged on the tip 10 of the tool 5. These cutting elements enable a removal of material in the axial direction of the tool 5. The provision of cutting elements 11 on the tip 10 of the tool 5 is not imperative because the machining occurs via the cutting edges 8 on the circumferential surface 7.

Figure 1B:
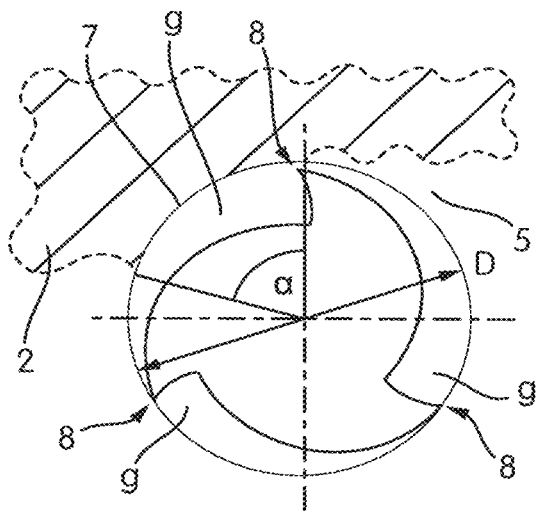
FIG. 1B is a front view of a milling tool with three cutting edges

A milling tool with three cutting edges 8 is depicted in FIG. 1B. A cylindrical end milling tool with two or more cutting elements is particularly suitable.

FIG. 1 shows, that the tool 5 and the workpiece 2 are subjected to a relative movement along the tool path 1 orthogonal (or in the embodiment of FIG. 8, diagonal) to the tool axis 6, wherein the tool path 1 has directional components transverse to the run of the contour 3.1 to be produced as well as directional components pointing away from the contour 3.1 to be produced. The path illustrated here corresponds to a path known in trochoidal milling, but in which according to the invention the insertion depth of the tool is greater than in known trochoidal milling.

The relative movement between the tool and the workpiece comprises the following movement types:
a) forward movement of the tool 5 toward the workpiece 2 in a forward feed direction that is essentially perpendicular to the longitudinal axis 6 of the tool 5 and follows the contour 3.1 to be produced;
b) two-dimensional lateral and backward movement of the tool 5 relative to the workpiece 2 along a specified path in a plane that is essentially perpendicular to the longitudinal axis 6 of the tool 5;
c) unvarying insertion depth of the tool in the workpiece along the symmetry axis of the tool.

As an alternative to c), provision can be made for a slight modulation of the insertion depth, represented by the arrow 5.2, particularly in the order of 0.1×D.

The tool path 1 shown in FIG. 1 is such that the tool 5 enters into the workpiece 2 laterally to an inner support section 4.1, via which the fitting body 3 to be produced or the preform is connected to the workpiece remnant 4. This entry therefore does not occur over the shortest distance to an equator line 20 (FIGS. 4A, B, 5A, B) of the contour 3.1 to be produced and along the same, but remains, until the specified form of the support section 4.1 is reached, at a distance to this equator line 20, which is traversed only after reaching the support section in order to create the fitting body or its preform. The tool leaves the tool path along the equator line 20 upon reaching the support section 4.1 and is withdrawn from the workpiece 2.

In FIG. 1B it is furthermore shown that the tool 5 inserts into the workpiece 2 during machining at a cutting arc angle alpha of the circumferential surface 7 of less than 90°. Even if the cutting arc angle alpha were to exceed 90° in some situations, according to the invention the cutting arc angle alpha is on average less than 90°, i.e., viewed over the entire tool path 1.

FIG. 2A shows a top view of a fitting body 3 in the form of a crown, which is to be carved out of a workpiece by a simultaneous machining of the workpiece 2 with two tools 5a, 5b. In contrast to FIG. 1, the tools 5a, 5b enter into the workpiece 2 from the side 2.4 facing away from the support section in the direction of the equator line 20 of the contour 3.1 to be produced, and are each guided separately along the corresponding portion of the equator line 20 to the support section 4.

Figure 2D:
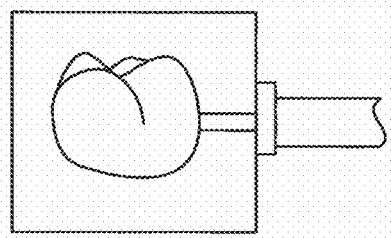
FIG. 2D is a lateral view of a position of a crown in the block.
Figure 2E:
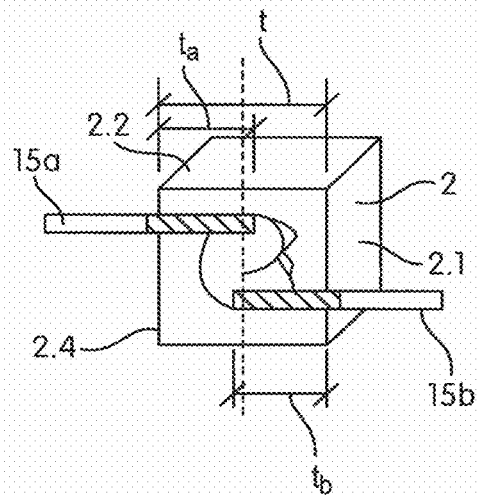
FIG. 2E is a perspective view of a simultaneous machining with a limited cutting-edge length that is less than the block height.

FIG. 2B shows a simultaneous machining of the workpiece 2 in the form of a block with two tools 15a, 15b in a first frontal view, wherein the tools 15a, 15b penetrate the block to a length ta, tb that is shorter than the block thickness t (see FIG. 2E). As a consequence, each tool 15a, b only machines approximately half of the block along a portion of the equator line 20 of the contour 3.1 to be produced, with the exception of the support section 4.1. The machining occurs via the circumferential surface originating from the tip of the tool and optionally via the tip itself. The tools 15a, b enter into the workpiece 2 on the side 2.4 facing away from the support section 4.1.

The workpiece 2 in the shape of a block has a holder 16 with a holder axis 17, which is arranged on the side 2.3 facing the support section and about the holder axis 17 of which the workpiece 2 is rotatable.

Figure 2F:
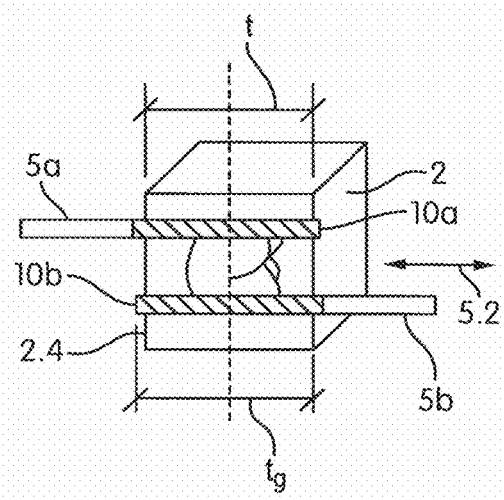
FIG. 2F is a perspective view of a simultaneous machining over the total block height.

FIG. 2C shows a simultaneous machining of the workpiece 2 with two tools 5a, b in a first frontal view, wherein the tools 5a, b have a length tg that is longer than the block thickness t, whereby the tools 5a, b penetrate through the whole block and a tip 10 protrudes (see FIG. 2F). The tip 10 does not play any role. The tool 5 can be moved back and forth in a longitudinal direction, as indicated by the arrow 5.2, so that use can be made of the entire circumferential surface of the tool 5a, b. Analogously to FIG. 2B, each tool machines only a portion of the equator line. Here also, the tools enter into the workpiece 2 on the side facing away from the support section 4.1. The holder 16, about the holder axis 17 of which the workpiece 2 can be rotated, is situated on this side.

Figure 3:
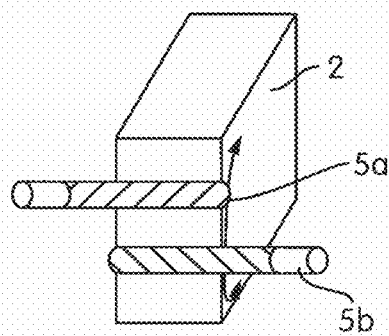
FIG. 3 is a perspective view of FIG. 2A.

FIG. 3 shows a perspective view of FIGS. 2A and 2C with the tools 5a, 5b, which machine the workpiece 2 from two sides set on top of them.

FIG. 2D shows the fitting body of FIGS. 2A-C to be carved from the workpiece 2 in another alignment, which is rotated 90° relative to the holder axis 17 of the workpiece 2. However, the position of the not illustrated machining tools has not changed with respect to FIGS. 2A-C; they extend into or out of the drawing plane, respectively.

Figure 4A:
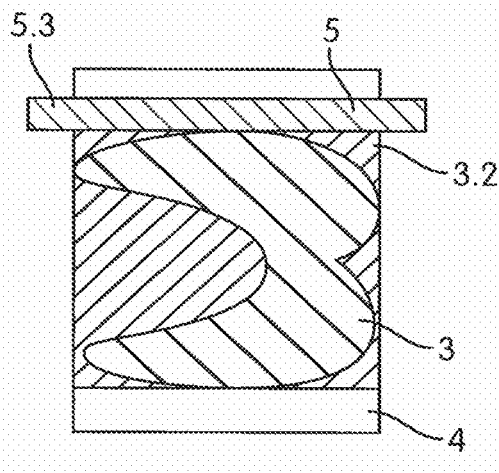
FIG. 4A is a sectional view of the first machining step from 0° machining direction.
Figure 4B:
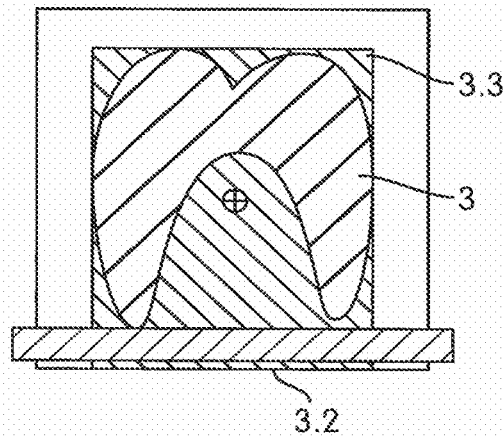
FIG. 4B is a sectional view of the second machining step from 90° machining direction.

Sections of FIGS. 2A, 2D are represented in FIGS. 4A, 4B. A portion of the workpiece 2 has already been machined along an outline (see FIGS. 5A, 5B below) with a single machining tool 5; another portion of the workpiece 2 is in engagement with the machining tool 5. The workpiece passes through the block or rather a tip 5.3 protrudes from the block so that machining takes place exclusively at the circumferential surface of the tool 5. In FIG. 4a, remnant material 3.2 remains on the workpiece 2, in the plane relative to the fitting body or a preform to be produced that has not been machined. By 90° rotation, as shown in FIG. 4B, this remnant material 3.2 can also be removed. However, it is also clear that remnant material 3.2 is still left, which will be removed in a further machining process. For the sake of completeness, it should be pointed out that this representation does not account for allowance of the preform or of the fitting body 3.

Figure 5A:
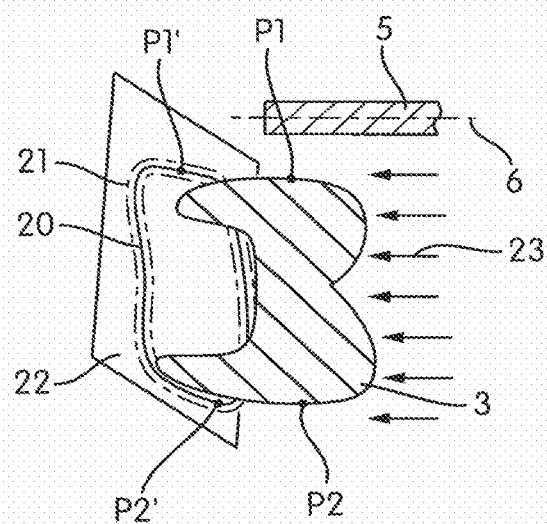
FIG. 5A is a projection of the equator line from 0° machining direction.
Figure 5B:
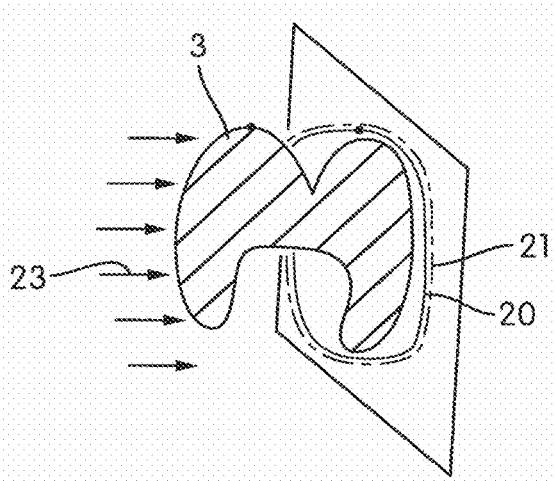
FIG. 5B is a projection of the equator line from 90° machining direction.

For creating a preform, the machining of the workpiece 2 with the tool 5 having the tool axis 6 (see FIG. 1) can occur along a equator line 20 of the fitting body to be produced, wherein as illustrated in FIGS. 5A, 5B, the equator line 20 is formed by a 2D projection of the 3D contour 3.1 parallel to the tool axis 6. This corresponds to the outline in the plane 22. By way of an example, two points P1, P2 are plotted in a section, which points comprise the greatest change of the fitting body 3 perpendicular to the tool 5 in the section. These points P1, P2 are projected as points P1' and P2' and the sum of the points P1, P2 over all sections gives the equator line of the fitting body 3 viewed in the machining direction, or rather the sum of the points P1', P2' over all sections gives the equator line 20 in the machining allowance. Provision can thus be made of allowance 21 to the equator line 20. With this allowance 21, it is possible to ensure that the outer contour of the final fitting body 3 is always situated within the rough contour of the preform.

In FIGS. 5A, 5B, the allowance 21 is accounted for in the plane 22 of the 2D projection of the equator line 20 parallel to the longitudinal axis 6 of the machining tool 5, represented by the arrow 23. FIG. 5A shows the fitting body 3 to be produced, in this case the crown from FIGS. 2A-D, and the outline of the equator line 20 with an allowance 21 resulting from the 2D projection.

FIG. 5B shows the fitting body 3 to be produced, in this case the crown from FIGS. 2A-D, which is rotated 90° with respect to FIG. 5A, again with the equator line 20 with a machining allowance 21. The allowance is 0.1×D to 0.02×D. In the case of a milling tool with a tool diameter D=2.5 mm and a slot width of 1.5×D, an allowance of 0.2 mm, which corresponds to 0.08×D, has proven suitable.

Figure 6A:
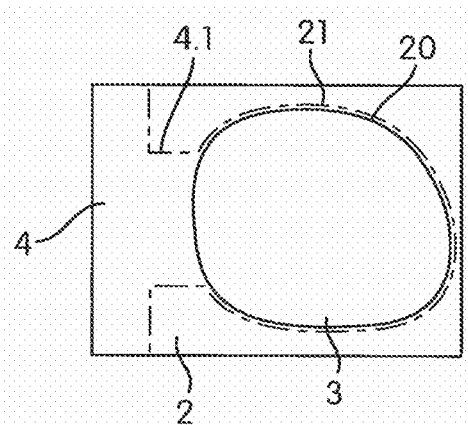
FIG. 6A is an equator line with allowance incl. support section from FIG. 5A.
Figure 6B:
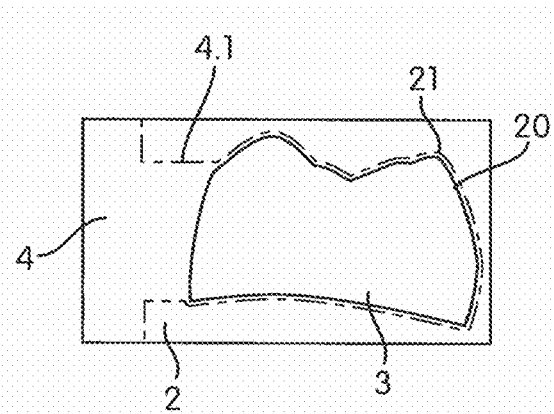
FIG. 6B is an equator line with allowance incl. support section from FIG. 5B.

The typical equator lines 20 from the outline of a fitting body 3 (e.g. a crown) from FIG. 5A, B are shown in FIG. 6A, 6B, wherein provision is made of an allowance 21. Contrary to FIG. 5A, 5B, provision is made of a support section 4.1, on which the fitting body to be produced has remained unmachined in order to ensure the connection to the unmachined workpiece remnant 4.

A machining in two positions of the workpiece, namely 0° and 90°, is deemed sufficient, nevertheless an in between inclined position of the workpiece 2 relative to the tool axis 6 or the holder axis 17 is possible.

In the case of a machining over the full height of the block, a standard block with a height of 15 mm leads to a cutting depth of 17.5 mm, since the tip 10 of the tool 5 is to be protected and the tool 5 therefore protrudes beyond the workpiece 2 during the cutting for detaching remnant material. The milling tool used should therefore have an effective cutting element length of 18 mm. The cutting depths must be suitably adapted for other block sizes or other tools.

The length of the tip to be protected depends upon the embodiment thereof and is typically in the range of 0.5×D to 1×D. For a hemispherical tip, this length is 0.5×D.

For a block with a height dH of 15 mm and a tool diameter D of 2.5 mm, this gives rise to a height dH that is 6 times the tool diameter D.

In order to maintain the insertion depth needed for protecting the tip of the tool, with 17.5 mm the effective length IW of the tool is 7 times the tool diameter. The length of the tip IS is around 1× the tool diameter D.

The groove width of the groove produced by full-width cutting is 1.5×D rather than only 1.0×D. In the case of a milling tool with D=2.5 mm, the groove width would be 1.5*2.5 mm=3.75 mm. The feed, also known as forward feed, is 0.1×D to 0.5×D per trochoid. In the case of a milling tool with a tool diameter D=2.5 mm and a groove width of 1.5×D, a feed of 0.3 mm, which corresponds to 0.12 D, has proven suitable.

Figure 7A:
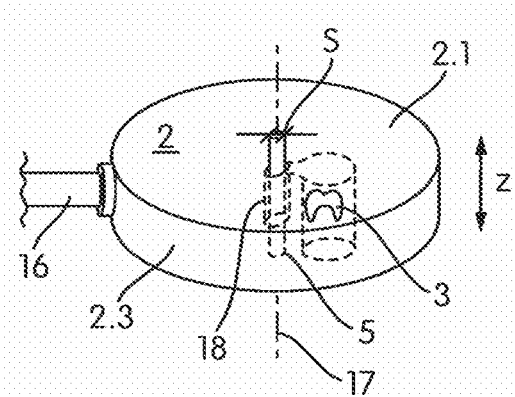
FIG. 7A is a perspective view of a workpiece in the shape of a disc with a recess.

A workpiece 2 in the form of a disc connected to a holder 16 with one recess 18 in each case is depicted in FIGS. 7A, B, wherein the recesses 18 are either already provided in the production of the workpiece 2 or can be provided before milling by drilling with a drilling tool. The disc-shaped workpiece 2 has a first outer surface 2.3 for connecting to the holder 16 and another, second outer surface 2.1 for the machining of the workpiece by contact with the machining tool 5. The recess 18 is situated completely within the second outer surface 2.1 such that the recess 18 is spaced apart from the first outer surface 2.3. The recess 18 thus penetrates completely through the workpiece 2 and can furthermore be aligned parallel to the direction of the longitudinal axis of the tool.

The machining via the circumferential surface of the tool can be started from this recess 18. To this end, the machining tool 5 is preferably positioned in the recess 18 of the workpiece 2, without contacting the workpiece 2, by sliding in the z-direction before the machining of the workpiece with the circumferential surface of the tool occurs, in order to carve the fitting body 3 in a near net shape manner at least in the plane perpendicular to the longitudinal axis 17 of the machining tool 5.

The recess 18 has around twice the diameter D of a machining tool 5 typically used for machining the workpiece 2 for producing dental fitting bodies 3 and the distance to the first outer surface 2.3 on which the workpiece is held corresponds roughly to 5 times the diameter of the machining tool 5 typically used for machining the workpiece 2 for producing dental fitting bodies 3.

Figure 7B:
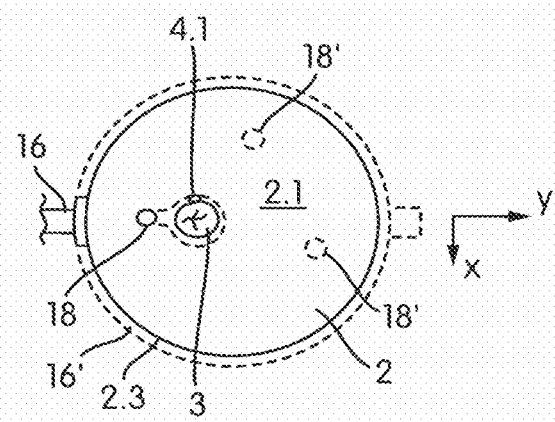
FIG. 7B is a top view of the workpiece from FIG. 7A.

Provision can also be made of other recesses 18', 18" (FIG. 7B) so as to be able to start with a machining on different places of the workpiece.

Instead of a one-sided fastening of the workpiece 2 in the shape of a disc to a holder 16 arranged on the outer surface 2.3, the workpiece 2 can also be clamped around its edge, in other words along the first outer surface 2.3, in a holder 16', in a manner known for workpieces of the state of the art, which are known as circular blanks or discs. To this end, the holder 16' surrounds the outer surface 2.3 over the whole circumference of the workpiece 2.

In this case also, the workpiece is machined over the outer surface 2.1.

The invention claimed is:

1. A method for producing a dental fitting body with a specified or custom three-dimensionally curved outer contour or for producing a preform of the fitting body with a roughly-shaped outer contour that requires further processing, the method comprising:
   machining a workpiece in a material-removing manner by means of a tool engaging into the workpiece with one or more cutting edges that are arranged on a circumferential surface of the tool,
   rotating the tool about a tool axis, wherein the tool and the workpiece execute a relative movement along a tool path orthogonal or inclined to the tool axis, wherein the tool path has directional components transverse to a run of the contour to be produced,
   wherein the one or more cutting edges have a defined geometry and the tool engages into the workpiece at a cutting are angle alpha of the circumferential surface of less than 90° on average viewed over the entire portion of the tool path at which the machining occurs and the tool engages into the workpiece at an insertion depth of at least twice a tool diameter (D) of the tool, and
   wherein the machining of the workpiece occurs along the tool path following the specified or custom three-dimensionally curved outer contour or the roughly-shaped outer contour.

2. The method according to claim 1, wherein a machining length of each of the one or more cutting edges arranged on the circumferential surface is greater than or equal to a thickness of the workpiece in the direction of the tool axis of the tool and wherein a machining occurs along the circumferential surface over the thickness of the workpiece.

3. The method according to claim 1, wherein a machining length of each of the one or more cutting edges arranged on the circumferential surface is less than a thickness of the workpiece in the direction of the tool axis of the tool, and wherein a first machining occurs over a fraction of the thickness of the workpiece with the one or more cutting edges arranged on the circumferential surface so that an unmachined remaining thickness is left and wherein, after the workpiece is turned 180°, a second machining occurs along the circumferential surface over a remainder of the thickness of the workpiece.

4. The method according to claim 3, wherein the tool has, in addition to the one or more cutting edges arranged on the circumferential surface, defined cutting edges for material removal in the axial direction arranged on a tool tip of the tool, wherein the first machining additionally occurs with material removal in the axial direction, and wherein the second machining occurs with exclusion of the cutting edges for material removal in the axial direction.

5. The method according to claim 1, wherein the one or more cutting edges arranged on the circumferential surface adjoin a chip space of the tool.

6. The method according to claim 1, wherein the insertion depth of the tool in the workpiece is subject to change along the tool axis during forward, lateral, and/or backward movement relative to the workpiece, which change is up to 0.2×D.

7. The method according to claim 1, further comprising the step of performing further machining of the workpiece, wherein during the further machining, the workpiece and the tool are aligned to each other in a manner other than that of the previous machining.

8. The method according to claim 1, wherein during the machining of the workpiece, the fitting body to be produced or the preform of the fitting body is connected via an inner support section to a workpiece remnant and wherein entry of the tool into the workpiece occurs laterally to the support section outside an equator line of the fitting body or of its preform.

9. The method according to claim 1, wherein during the machining of the workpiece, the fitting body to be produced or its preform is connected via an inner support section to a workpiece remnant and entry of the tool into the workpiece occurs at a distance from the support section.

10. The method according to claim 1, wherein the machining of the workpiece comprises trochoidal milling, and wherein entry of the machining tool into the workpiece for the machining of the workpiece by trochoidal milling occurs exclusively transverse to the tool axis.

11. The method according to claim 10, wherein a positioning of the machining tool in a recess of the workpiece occurs before the engaging of the machining tool into the workpiece.

12. The method according to claim 10, wherein for producing a recess before the machining of the workpiece by trochoidal milling with the machining tool, an entry of the machining tool or of another machining tool occurs in the direction of the tool axis of the trochoidal milling machining tool.

13. The method according to claim 1, wherein an additional tool for machining the workpiece is present and engages on the workpiece, which additional tool is rotated about a further tool axis, and wherein the two tools are arranged at a parallel distance of the tool axes to each other and are guided and driven from opposing sides of the workpiece to perform simultaneous machining of the workpiece.

14. The method according to claim 1, wherein the workpiece includes a chip-forming material selected from the group consisting of:
one or more ceramics in the pre-sintered state;
one or more filled or unfilled plastics; and
one or more metals in the pre-sintered state.

* * * * *